United States Patent [19]

Freed, Jr.

[11] Patent Number: 5,037,048

[45] Date of Patent: Aug. 6, 1991

[54] BULK INK RESTRAINT ASSEMBLY

[75] Inventor: Donald L. Freed, Jr., Belleville, Ill.

[73] Assignee: Marsh Company, Belleville, Ill.

[21] Appl. No.: 417,710

[22] Filed: Oct. 2, 1989

[51] Int. Cl.[5] .................... F16M 13/00

[52] U.S. Cl. .................... 248/154

[58] Field of Search .......... 248/125, 146, 149, 150, 248/152, 154, 311.2, 313, 316.4, 507, 508; 220/85 H

[56] References Cited

U.S. PATENT DOCUMENTS

| | | | |
|---|---|---|---|
| 509,222 | 11/1893 | Higbie | 248/125 |
| 899,031 | 9/1908 | Davis | 248/154 |
| 2,768,805 | 10/1956 | Gribble | 248/508 |
| 2,891,753 | 6/1959 | Bittle | 248/154 |
| 2,930,561 | 3/1960 | Bittle | 248/125 |
| 3,003,728 | 10/1961 | Shaw | 248/154 |
| 3,201,075 | 8/1965 | Sievers | 248/154 |
| 3,224,595 | 12/1965 | Sherley | 248/154 |
| 3,255,986 | 6/1966 | Eadie | 248/907 |
| 4,848,711 | 7/1989 | Mandel | 248/346 |

FOREIGN PATENT DOCUMENTS

| | | | |
|---|---|---|---|
| 2441366 | 7/1980 | France | 248/346 |

*Primary Examiner*—Ramon O. Ramirez
*Assistant Examiner*—Robert A. Olson
*Attorney, Agent, or Firm*—Rogers, Howell & Haferkamp

[57] ABSTRACT

A bulk ink restraint comprises a restraint base, a column, an ink hose support, and a clamp assembled for maintaining positional stability of a bulk ink container and simplifying bulk ink container change out after depletion of the ink supply.

1 Claim, 3 Drawing Sheets

BULK INK RESTRAINT ASSEMBLY

BACKGROUND OF THE INVENTION

This invention relates to a bulk ink restraint assembly for an ink jet printing machine and more specifically to a device for securing a bulk ink tank in place and preventing instability of the tank by way of bulging after pressurization.

An ink jet printing apparatus incorporates a print head, a valve and control system to control ink flow, and an ink source. Typically, the ink source is a bulk ink tank that is supported by a bulk ink restraint assembly. It is important that a bulk ink restraint assembly secure an ink tank and yet allow convenient replacement of an empty tank with a full one. Connections of hoses should require a minimum amount of time and hose connector ends should be readily accessible. The restraint assembly should retain the ink tank even when its bottom bulges under operating pressure because otherwise the tank may topple.

A prior art restraint assembly heretofore sold by the assignee of this application generally comprises a plywood base plate upon which a bulk ink tank rests. The tank is secured in place by means of a crossbar across the top of the tank and chains connected between the crossbar and the base. However, these prior restraint assemblies require separate equipment and skills to produce and finish the wood base, manufacture the crossbar, and produce the chains. Also, each installation of an ink tank requires rather meticulous manipulation of the cross bar and tightening of two chains.

The present invention overcomes these and other problems of the prior art in the provision of an aluminum bulk restraint assembly which requires only one kind of equipment and one manufacturing trade. With the present invention, a user can move the bulk ink container easily into or out of the restraint assembly. As can be appreciated, this requires only minimal downtime of the ink jet printing procedure.

SUMMARY OF THE INVENTION

The bulk ink restraint assembly of the present invention comprises a restraint base, a column extending upwardly from the base, a clamp slidably mounted on the column for securing the bulk ink container between the clamp and the restraint base, and a bracket on the column for supporting hoses or lines that deliver pressurized ink. All components are of aluminum and can be formed and finished with metal shaping equipment. Square nuts and screws are used to slidably limit the position of the clamp. Otherwise, the clamp and the base each incorporates a leverage lock that is manually releasable and requires no moving parts. The bracket assures convenient location of the ink line connector ends so that connections and disconnections to ink tanks are facilitated.

The bulk ink restraint assembly of this invention provides for easy, efficient manufacture, quick assembly, and convenient installations of bulk ink tanks with a self-locking feature eliminating the disadvantages that are associated with the chain locking mechanism. The bulk restraint assembly additionally allows the user to feed more than one pressurized ink line by way of the attached bracket and ink manifold, which keeps the connector ends readily available, thereby increasing the efficiency of the overall assembly.

DETAILED DESCRIPTION OF THE DRAWINGS

DETAILED DESCRIPTION OF THE PREFERRED EMBODIMENT

Figure 1:
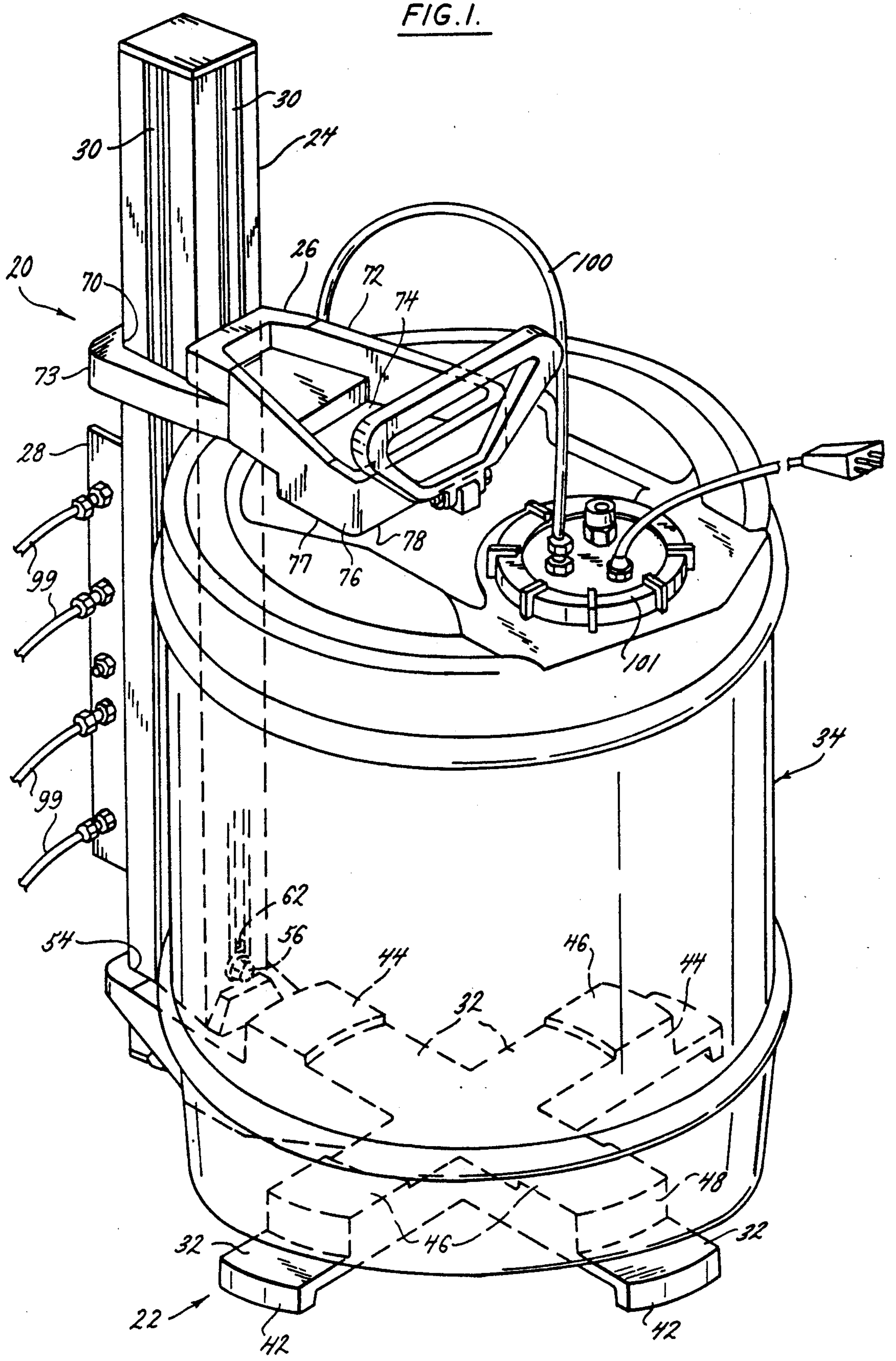
FIG. 1 is a perspective view of the bulk ink restraint assembly with a five-gallon bulk ink tank shown installed.
Figure 2:
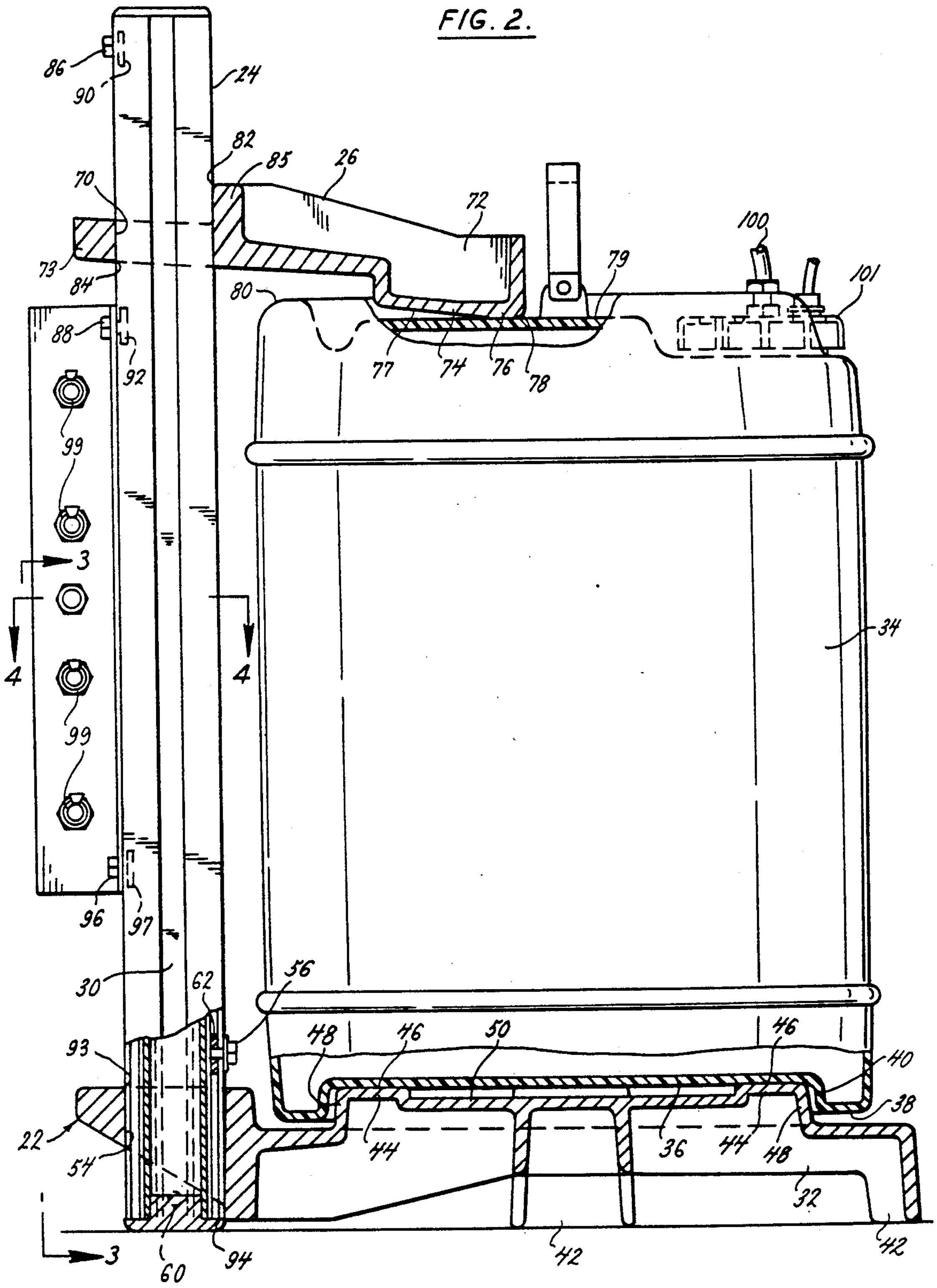
FIG. 2 is an elevation view of the bulk ink restraint assembly with portions shown in medial section.
Figure 4:
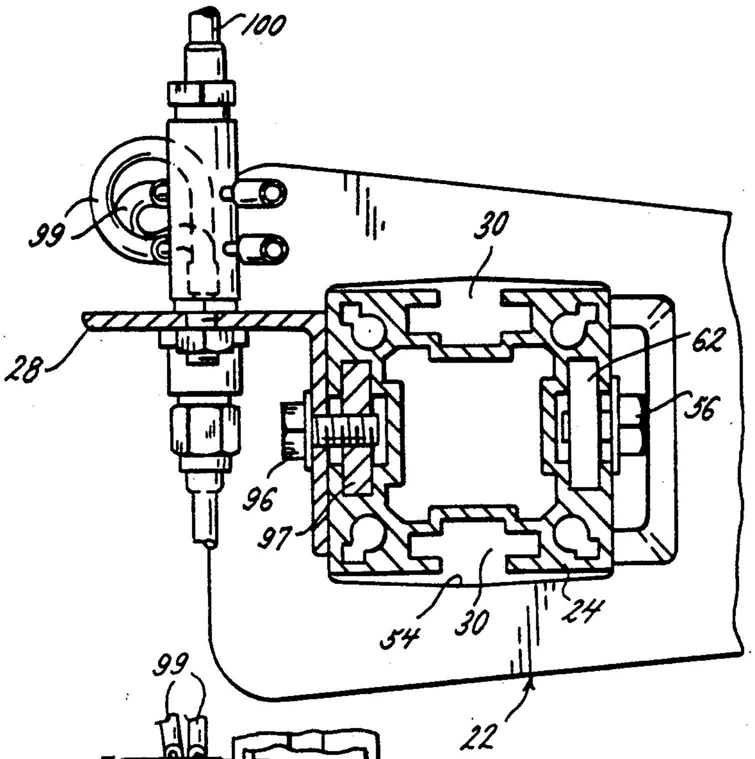
FIG. 4 is a view in section of the beam assembly taken along the plane of the line 4—4 of FIG. 2.
Figure 3:
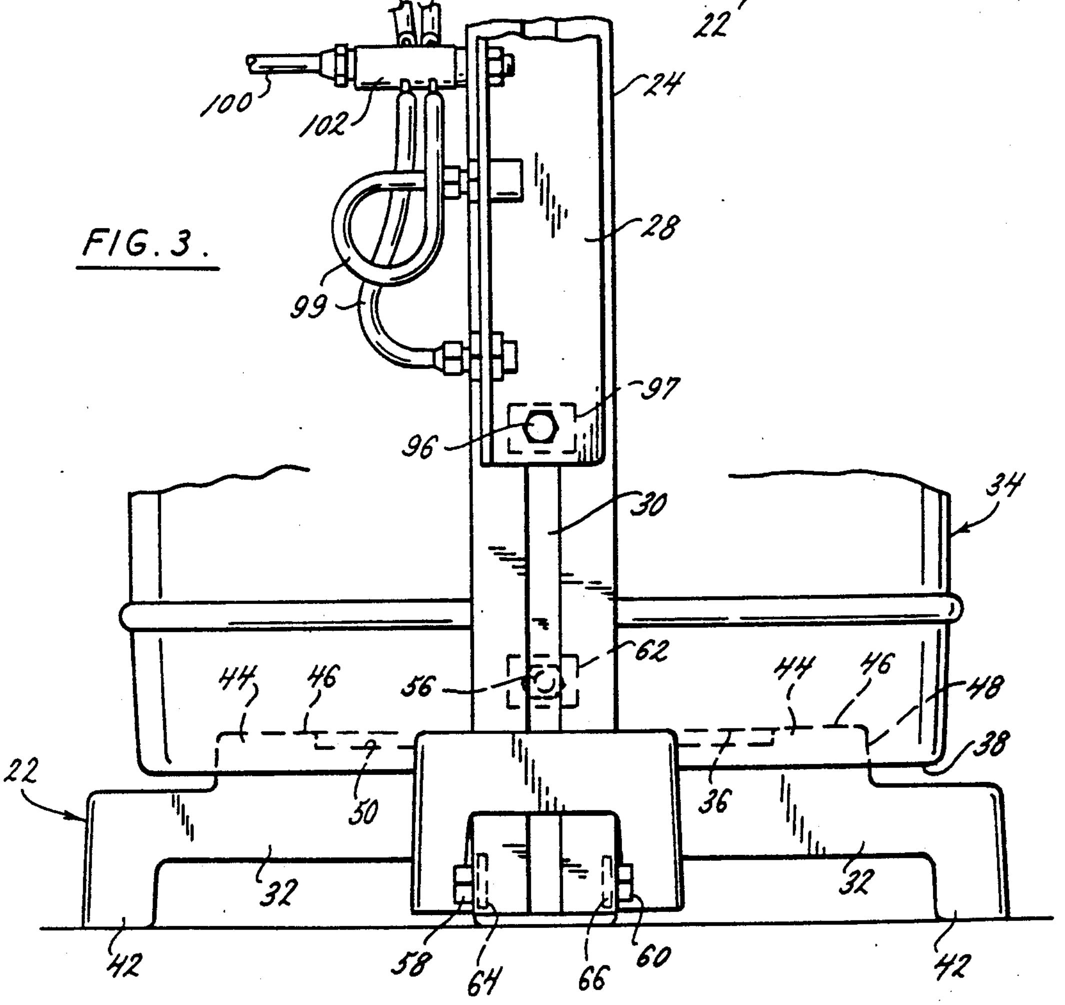
FIG. 3 is a rearward elevation view of the lower portion of the bulk ink restraint assembly.

The bulk ink restraint assembly 20 of this invention incorporates a cast restraint base 22, an extruded column 24, a cast clamp 26 and a bracket 28 to support ink hoses.

The extruded column 24 is the backbone of the restraint assembly 20. The extruded column 24 has T slots 30 in each of the four long sides. These T slots 30 run the entire length of the column 24 and serve to provide an infinite number of locations for the screws and square nuts which secure the various components 22, 26, 28 in place as will be described.

The restraint base 22 has four orthogonally positioned legs 32 that support a standard bulk ink container 34. The bulk ink container has a bottom 36 that is surrounded by a downwardly extending peripheral tank base 38 having an inner annular wall 40. The bottom 36 bulges downwardly when the tank is pressurized in use. Each leg 32 terminates in an outer foot 42.

The restraint base 22 conforms to the bottom and tank base of the bulk ink tank 34 by means of stepped risers 44. These risers 44 have upper surfaces 46 on which the bottom 36 of the tank rests and have arcuate outer walls 48 that complement the annular wall 40 of the tank. Radially inward of the risers, the top 50 of the legs 32 are spaced below the bottom 36 to accommodate bulging of the tank bottom during use.

The restraint base 22 supports the column 24 in a cutout 54 in the restraint base. The column is inserted into the base cutout and the base is positioned between an upper screw 56 and two lower screws 58 and 60. The three screws 56, 58, and 60 are threaded, respectively, into square nuts 62, 64, 66 which are inserted into T-slots 30 in the column 24. The screws 58 and 60 prevent the column from being inadvertently removed from the base when ink containers are being replaced. The screw 56 limits upward sliding movement of the base 22.

The clamp 26 has a cutout 70 through which the column 24 projects, allowing the clamp 26 to slide on the column 24. The clamp 26 also has a rearward projection 71. The clamp 26 additionally consists of a lever arm 72 projecting forwardly (across the top of the tank 34) and has a short rearward projection 73. The width of the lever arm 72 is progressively greater as it extends forwardly, outwardly from the beam assembly 24. The center 74 of the lever arm is hollow to minimize weight and material usage. The lever arm has a projection 76 having a bottom edge 77 that slopes downwardly as it extends inwardly relative to the container 34, terminating at an innermost and lowermost transverse edge 78. The ink container 34 has a top 79 surrounded by an upstanding annular lip 80. The lever arm is formed so that the projection is radially inward of the annular lip 80 which allows the lever arm to contact the ink container top 79 generally central of the container top without interference with the annular lip 80. The central contact edge 78 allows for maximum deflection of the lever arm 72 upon pressurization of the bulk ink container 34.

As the lever arm 72 deflects from contact with the container top 79, the clamp 26 rocks on the column 24 until diagonally opposite edges 82 and 84 of the clamp cutout 70 contact the column 24. The edge 82 is elevated by a projection 85 to increase the effectiveness of the locking mechanism by reducing the arc which edge 82 must traverse before binding against the column 24. This locking mechanism which is dependent upon an application of force from the pressurized ink container 34 limits bulging of the container and consequent instability of the ink container 34.

The clamp 26 is slidably constrained between two stops which consist of screws 86, 88 threaded into square nuts 90, 92. The square nuts 90, 92 ride in the T slots 30 of the column 24 and are used to lock the screws 86, 88 in position along the beam assembly at the desired location. The first screw 86 creates a stop to prevent inadvertent separation of the clamp 26 from the column 24. The second screw 88 maintains a minimum height for the clamp so that the clamp need be raised only a few inches to allow placement of the bulk ink container 34 on the restraint base 22 over the stepped risers 44. The second screw 88 and its mating square nut 92 additionally serve to attach the bracket 28 to the column 24.

Returning to the base 22, there are contact edges 93 and 94 on the base on opposite sides of the cutout 54. These edges 93 and 94 contact opposite sides of the column 24 and lock the base against downward movement when pressure is applied by bulging of the tank. This locking action of the base 22 is similar to what has already been described with respect to the clamp 26.

The bracket 28 is also attached to the column 24 by a second screw 96 and square nut 97. The bracket 28 itself supports one or more hoses 99 that lead to the valves of an ink jet print head (not shown). A single hose 100 is used to transfer the ink from a master cap 101 on the ink container 34 to an ink manifold 102 which is mounted on the bracket 28. The manifold 102 distributes the pressurized ink to the various hoses 104.

Operation:

In the operation of this bulk ink restraint assembly 20, the objective is to quickly and easily load and then constrain a container of bulk ink 34. The first step of the operation is to raise the clamp 26 several inches above the restraint screw 88. This is accomplished by applying an upwardly directed force to the bottom of rearward projection 73 on the side opposite the lever arm 72 and sliding the clamp to the desired location. Once raised to the desired location, the clamp 26 will freely slide to the screw 88 unless restrained. The capacity to freely slide on the beam assembly upon application of a force at the projection 73 and not slide upon application of a force at the end 78 of the lever is a function of the clamp 26 geometry. When an upward force is applied to the transverse edge 78, the elevated edge 85 of the projection 83 immediately contacts and binds against the column 24 as the edge 84 maintains contact on the opposite side of the column 24.

While the clamp 26 is held in an elevated position, usually against the stop 96, the bulk ink container 34 is lifted into position onto the restraint base. The bulk ink container bottom peripheral base 38 must clear the stepped risers 44 on the restraint base 22 until the container 34 is centrally located on the restraint base 22. After the container 34 is stably positioned and properly oriented on the restraint base 22, the clamp 26 is released and will slide downwardly until contact occurs between the lever arm 72 and the bulk ink container 34. The ink feed hose 100 is routed from the master cap 101 to the manifold 102 which is mounted on the bracket 28. The manifold 102 serves to distribute the pressurized ink supply to the valves of an ink jet print head (not shown).

After the ink feed hoses 99 and 100 are properly coupled to the manifold 102, the master cap 101, and the ink jet valves (not shown), the bulk ink container 34 can be pressurized in the conventional manner, normally to between seven and ten psi. Upon pressurization, the bottom 36 of the bulk container 34 bulges downwardly and the top 79 of the container bulges upwardly. This upward bulging causes the clamp lever arm 72 to deflect upward also. Bulging o the bottom 36 of the tank is accommodated by the spacer above the tops 50 of the legs 32, allowing the tank to remain stabilized as its outer circumferential area rests upon the surfaces 46 of the risers, and the peripheral tank base 38 maintains contact at its inner wall 40 with the risers 44. Deflection is controlled as the walls of the cutout 70 bind against the beam assembly 24 following movement of about ¼ inch. At this time the bulk ink container 34 is securely locked in place. Upon depressurization the clamp 26 will become unbound and can be raised to facilitate removal and replacement of the bulk ink container 34.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A pressurized tank restraining assembly comprising a base, a column supported by the base, and a clamp movably supported and adjustable along the column, the clamp having two sets of diametrically opposed edges which move into binding contact with a bearing face of the column as the pressurized container expands, support for the column is by means of a cutout in a section of the base and the base has edges between removable and adjustable securing means on the column that secure that base against movement;

the clamp has a downward sloping lever arm which is of progressively increasing width, said lever arm contacting the bulk ink container generally central of the container top and over a wide area to avoid concentration of pressure;

and including screws and square nuts for adjustably securing the base to the column and for limiting vertical movement of the clamp, the column having flat sides with T slots for receiving the square nuts.

* * * * *